United States Patent
Wiggs

(10) Patent No.: US 7,234,314 B1
(45) Date of Patent: Jun. 26, 2007

(54) GEOTHERMAL HEATING AND COOLING SYSTEM WITH SOLAR HEATING

(75) Inventor: B. Ryland Wiggs, Franklin, TN (US)

(73) Assignee: Earth to Air Systems, LLC, Franklin, TN (US)

( * ) Notice: Subject to any disclaimer, the term of this patent is extended or adjusted under 35 U.S.C. 154(b) by 0 days.

(21) Appl. No.: 10/616,701

(22) Filed: Jul. 10, 2003

Related U.S. Application Data

(60) Provisional application No. 60/471,585, filed on May 19, 2003, provisional application No. 60/456,335, filed on Mar. 20, 2003, provisional application No. 60/439,831, filed on Jan. 14, 2003.

(51) Int. Cl.
F25B 27/00 (2006.01)

(52) U.S. Cl. .................. 62/235.1; 62/260; 165/45

(58) Field of Classification Search ............ 62/260, 62/236, 235.1, 238.6; 165/45
See application file for complete search history.

(56) References Cited

U.S. PATENT DOCUMENTS

| | | | | |
|---|---|---|---|---|
| 3,812,903 | A | * | 5/1974 | Thomason ............... 165/236 |
| 4,062,489 | A | * | 12/1977 | Henderson ............... 237/1 R |
| 4,158,291 | A | * | 6/1979 | Jones ..................... 60/641.1 |
| 4,205,718 | A | * | 6/1980 | Balch ....................... 165/45 |
| 4,224,805 | A | | 9/1980 | Rothwell ................... 62/260 |
| 4,325,228 | A | * | 4/1982 | Wolf ........................ 62/260 |
| 4,336,692 | A | * | 6/1982 | Ecker et al. ................ 62/82 |
| 4,361,135 | A | * | 11/1982 | Metz ....................... 126/640 |
| 4,378,785 | A | * | 4/1983 | Fleischmann et al. ...... 126/584 |
| 4,378,787 | A | | 4/1983 | Fleischmann ........... 126/430 |
| 4,378,908 | A | * | 4/1983 | Wood ........................ 237/2 B |
| 4,438,881 | A | * | 3/1984 | Pendergrass .............. 237/2 B |
| 4,444,249 | A | * | 4/1984 | Cady ...................... 165/48.2 |
| 4,544,021 | A | | 10/1985 | Barrett ...................... 165/45 |
| 4,798,056 | A | * | 1/1989 | Franklin ................... 62/235.1 |
| 4,936,110 | A | * | 6/1990 | Kuckens ................... 62/260 |
| 4,993,483 | A | | 2/1991 | Harris ........................ 165/45 |
| 5,207,075 | A | * | 5/1993 | Gundlach .................. 62/434 |
| 5,738,164 | A | | 4/1998 | Hildebrand ................ 165/45 |
| 5,758,514 | A | * | 6/1998 | Genung et al. ............ 62/471 |
| 5,771,700 | A | | 6/1998 | Cochran .................... 62/117 |
| 5,941,238 | A | * | 8/1999 | Tracy ....................... 126/641 |

FOREIGN PATENT DOCUMENTS

JP 406299712 A * 10/1994
JP 020000199697 A * 7/2000

* cited by examiner

*Primary Examiner*—Mohammad M. Ali
(74) *Attorney, Agent, or Firm*—Waddey & Patterson; Mark J. Patterson

(57) ABSTRACT

A sealed well direct expansion geothermal heat exchange unit, whose sealed well can be placed in ground and/or in water, consisting of a conventional direct expansion, or other heat pump, system wherein the exterior refrigerant heat exchange lines are placed within an insulated and sealed container, which container is supplied with a circulating heat conductive liquid from and to a sub-surface sealed well encasement, which container liquid may be supplemented with heat from a solar heating system, and which unit's hot refrigerant vapor line may be supplementary cooled by means of condensate water evaporative cooling, as well as a means to provide any direct expansion, and any closed-loop water-source, geothermal heat pump system with an optional solar heating supplement in the heating mode, and with an optional water-cooled vapor line supplement in the cooling mode.

9 Claims, 6 Drawing Sheets

GEOTHERMAL HEATING AND COOLING SYSTEM WITH SOLAR HEATING

APPLICATION FOR UNITED STATES LETTERS PATENT

This application is a Continuation-In-Part application which claims benefit of co-pending U.S. Patent Application Ser. No. 60/439,831 filed Jan. 14, 2003, entitled "Deep Well Direct Expansion Heating/Cooling System"; U.S. Provisional Patent Application Ser. No. 60/456,335 filed Mar. 20, 2003, entitled "Deep Well/Long Trench Expansion Heating/Cooling System"; U.S. Provisional Patent Application Ser. No. 60/471,585 filed May 19, 2003, entitled "Deep Well/Long Trench Direct Expansion Heating/Cooling System and Retrofit Design"; and U.S. Provisional patent application Ser. No. 10/211,112 filed Aug. 2, 2002, entitled "Sealed Well Direct Expansion Heating and Cooling System", all of which are hereby incorporated by reference. A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

BACKGROUND OF THE INVENTION

The present invention relates to an improved in-ground/in-water heat exchange means for use in association with any heat pump heating/cooling system utilizing in-ground and/or in-water heat exchange elements as a primary or supplemental source of heat transfer.

Ground source/water source heat exchange systems typically utilize liquid-filled closed loops of tubing buried in the ground, or submerged in a body of water, so as to either absorb heat from, or to reject heat into, the naturally occurring geothermal mass and/or water surrounding the buried or submerged tubing.

Water-source heat pump heating/cooling systems typically circulate water, or water with anti-freeze, in plastic underground geothermal tubing so as to transfer heat to or from the ground, with a second heat exchange step utilizing a refrigerant to transfer heat to or from the water, and with a third heat exchange step utilizing a compressor and an electric fan to transfer heat to or from the refrigerant to heat or cool interior air space. Further, water-source heating/cooling systems typically utilize closed-loop or open-loop plastic tubing.

Closed-loop systems, often referred to as ground loop heat pumps, typically consist of a supply and return, ¾ inch to 2 inch diameter, plastic tube, joined at the extreme ends via an elbow, or similar, connection. The plastic tubing is typically of equal diameter, wall thickness, and composition, in both the supply and return lines. The water is circulated within the plastic tubing by means of a water pump. In the summer, interior space heat is collected by an a commonly understood interior compressor and air heat exchanger system, or air handler, and is rejected and transferred into the water line via a refrigerant line to water line heat exchanger. In a similar manner in the winter, heat is extracted from the water line and transferred to the interior conditioned air space via the refrigerant liquid within the refrigerant line being circulated in a reverse direction. Many such systems are designed to operate with water temperatures ranges of about a 10 degree Fahrenheit ("F") water temperature differential between the water entering and exiting the heat exchange unit's copper refrigerant transport tubing. Water temperatures are often designed to operate in the 40 to 60 degree F. range in the summer and in the 25 to 45 degree F. range in the winter with anti-freeze added to the water. If a closed-loop, 1.5 inch diameter, plastic water conducting tubing is installed in a horizontal fashion about 5 or 6 feet deep, in 55 degree F. earth, about 200 to 300 linear feet per ton of system capacity may be necessarily excavated. If the same closed-loop plastic water conducting tubing is installed in a vertical borehole in 55 degree F. earth, about 150 to 200 feet per ton of system capacity may be necessarily drilled. Requisite distances are longer for horizontal systems because near-surface temperature fluctuations are greater. However, trenching costs are usually less than drilling expenses. In the horizontal style installation, the plastic tubing loop is typically backfilled with earth. In the vertical style installation, the plastic tubing loop inserted into the typical 5 to 6 inch diameter borehole is generally backfilled with a thermally conductive grout. In either the horizontal or the vertical style installation, a water pump is required to circulate the water through the tubing lines, which are generally of equal diameter in both the supply and return segments.

Open-loop systems, often referred to as ground water heat pumps, typically exchange heat to and from interior conditioned air in the same manner as a closed-loop system, but the water circulation segment differs. In an open-loop system, water is pumped from a supply source, such as a well, river, or lake, is run through the water to refrigerant heat exchanger, and is then rejected back into a well, river, or lake. While open-loop systems can significantly reduce plastic tubing excavation or drilling requirements on a system capacity tonnage basis, if an adequate water supply is available, these systems pose a potential environmental threat since bacteria in the surface water transport tubing can be transferred to, and can infect, the water which is being rejected back into the public water supply.

Direct Expansion ("DX") ground source heat exchange systems typically circulate a refrigerant fluid, such as one of R-22 and R-410A, in copper underground or underwater geothermal tubing to transfer heat to or from the ground or water, and only require a secondary heat exchange step to transfer heat to or from the interior air space by means of an electric fan. In DX systems, the exterior heat exchange copper refrigerant tubing is placed directly in the geothermal soil and/or water. Historically, due to compressor operational limitations encountered with traditional DX designs installed at depths beyond 50 to 100 feet, most reverse-cycle DX systems, which operate in both the heating and the cooling modes, have been installed with an array of horizontal heat exchange tubes about 5 feet deep, or in vertical boreholes less than 100 feet deep. These prior limitations can be overcome via utilization of a supplemental refrigerant fluid pump, as disclosed in U.S. Utility patent application Ser. No. 10/073,513, by Wiggs.

While most in-ground/in-water heat exchange designs are feasible, various improvements have been developed intended to enhance overall system operational efficiencies. Several such design improvements are taught in U.S. Pat. No. 5,623,986 to Wiggs, in U.S. Pat. No. 5,816,314 to Wiggs, et al., and in U.S. Pat. No. 5,946,928 to Wiggs, the disclosures of which are incorporated herein by reference. These designs basically teach the utilization of a spiraled fluid supply line subjected to naturally surrounding geothermal temperatures, with a fully insulated fluid return line, as well as improved subterranean heat transfer tubing and system component designs.

Other predecessor vertically oriented geothermal heat exchange designs are disclosed by U.S. Pat. No. 5,461,876 to Dressler, and by U.S. Pat. No. 4,741,388 to Kuriowa. Dressler's '876 patent teaches the utilization of an in-ground spiraled fluid supply line, but neglects to insulate the fluid return line, thereby subjecting the heat gained or lost by the circulating fluid to a "short-circuiting" effect as the return line comes in close contact with the warmest or coldest portion of the supply line. Kuriowa's preceding '388 patent is virtually identical to Dressler's subsequent claim, but better, because Kuriowa insulates a portion of the return line, via surrounding it with insulation, thereby reducing the "short-circuiting" effect. Dressler's '876 patent also discloses the alternative use of a pair of concentric tubes, with one tube being within the core of the other, with the inner tube surrounded by insulation or a vacuum. While this multiple concentric tube design reduces the "short-circuiting" effect, it is practically difficult to build and could be functionally cost-prohibitive.

The problem encountered with insulating the heat transfer return line, by means of fully surrounding a portion of same with insulation as per Kuriowa, or by means of a fully insulated concentric tube within a tube as per Dressler, or by means of a fully insulated return line as per Wiggs' predecessor designs, is that the fully insulated portion of the return line is not exposed to naturally occurring geothermal temperatures, and is therefore a costly necessary underground/underwater system component which is not capable of being utilized for geothermal heat transfer purposes. While the utilization of such fully insulated costly components is an improvement over prior totally un-insulated geothermal heat transfer line designs subject to a "short-circuiting" of the maximum heat gain/loss potential, a design which insulates the supply line from the return line and still permits both lines to retain natural geothermal heat exchange exposure would be preferable, as disclosed in U.S. Utility patent application Ser. No. 10/127,517 by Wiggs. Further, of course, even in horizontal and vertical closed-loop water-source heat pump systems, this "short-circuiting" effect, caused by the supply and return water transfer lines being in close proximity to one another, is a problem which deters from operational system efficiencies.

An additional problem encountered with traditional closed-loop water-source systems is the fact that, traditionally, ¾ inch to 2 inch diameter plastic water transfer tubing is utilized, so as to reduce plastic pipe costs and excavation/drilling expenses. However, as a general principle, smaller pipe sizes have greater friction efficiency losses, which result in increased requisite pumping energy.

In the early 1990s, Wiggs developed the proposition of excavating a large surface, and near-surface, area of land for the placement of a sealed container, filled with a heat conductive liquid, such as water or water and anti-freeze, and then permanently placing the exterior heat exchange tubes of a direct expansion system into the liquid-filled container. However, after a more detailed review and confidential discussion with others, it was determined that the cost, as well as the requisite surface land area requirements, involved were not likely to be advantageous over a conventional direct expansion exterior heat exchange tube installation design, so the proposition was abandoned by Wiggs. Further, such an installation would still be affected by near-surface temperature fluctuations in both the summer and the winter, and would still be subjected to "short circuiting" efficiency disadvantages encountered by a mixture of heated and cooled container liquid. The present invention, however, is superior to Wiggs' former proposition in that via the subject invention, deep sub-surface temperatures are accessed which are relatively stable year round; surface area requirements to install the system are minimal, avoiding the necessity of tearing up a yard or a pavement area; and the otherwise necessary extensive excavation and soil removal costs are replaced by a simple drilling expense. Further, and importantly, the "short circuiting" disadvantages are avoided.

Finally, while discussions have been entertained regarding the desirability of incorporating solar heating benefits into a geothermal heat pump heating system, as well as incorporating evaporative cooling benefits into a geothermal cooling system, there have been practical obstacles, such as potential extreme system operational pressure differentials, flash gas problems, system short-cycling, and energy storage issues. A supplemental solar heating system designed to overcome these obstacles, while augmenting a geothermal heat pump heating system, would be preferable.

Although potentially unnecessary in a sub-surface application where the sub-surface conditions include a substantial amount of natural water convection, such as in a lake, ocean, or aquifer, where the Thermally Exposed Centrally Insulated Geothermal Heat Exchange Unit disclosed by Wiggs in U.S. Utility patent application Ser. No. 10/127,517 would be appropriate, a system design for geothermal direct expansion heat pumps, and/or for geothermal water-source heat pumps, which better avoided "short-circuiting" problems, which decreased friction efficiency losses, and which enabled solar heating and/or evaporative cooling supplements to be effectively utilized, with minimal additional costs, in subterranean soil and/or rock and/or stagnate water conditions, would be preferable. Such a preferable system would also be utilized in conditions containing a substantial amount of natural water convection where it would be useful to isolate the liquid coming into direct contact with copper refrigerant tubing from the surrounding natural water conditions, such as when the natural surrounding water conditions contain significant amounts of sulfur, acid, chlorine, or other substance potentially harmful to copper refrigerant tubing.

SUMMARY OF THE INVENTION

It is an object of the present invention to further enhance and improve the efficiency and installation cost functionality of predecessor geothermal heat exchange designs for closed-loop water-source heat pump systems, and for direct expansion heat pump systems. This is accomplished by means of a solar heat collector solar system that is operatively connected to a new, or to an existing, geothermal direct expansion, or closed-loop water-source, heat pump system so as to provide supplemental heat in the heating mode, when advantageous, by means of natural solar heat collector fluid convection.

More specifically, a borehole is drilled to a specified depth, depending on the amount of heat transfer desired, and a casement, such as a six inch diameter steel or plastic casement, which casement has been sealed at the bottom and at all joint areas along the sides, is inserted into the full depth of the borehole. Next, a smaller diameter, such as a two and one-half inch diameter open-ended plastic pipe, which has been fully insulated, is inserted to a depth near, within about six to twelve inches, the bottom of the sealed casement. The sealed primary casement extends to a point near, or above, the surface where the open-ended plastic pipe connects to a sealed container, such as a plastic tub. The plastic tub and the primary casement are fully insulated above-ground and to a depth at least equal to the maximum frost/heat line. Heat exchange coils, such as copper refrigerant tubing, having sufficient surface area to transfer the desired amount of heat, are placed into the sealed container, with an insulated supply and return refrigerant line extending to a conventional heat pump system, comprised of a compressor, an expansion valve, an interior air handler, and other customary equipment well-known to those in the trade. The sealed container, casement, and open-ended pipe are all then filled with a heat transfer liquid, such as water and/or water and anti-freeze, and a liquid circulating pump is attached near the top of the pipe so as to pull liquid up through the open-ended pipe from the bottom of the casement deep underground. As the liquid from the bottom of the casement is pulled up through the insulated pipe, the liquid from the bottom of the casement, which is cool in the summer and warm in the winter, will circulate over the refrigerant heat transfer line, which are hot in the summer and cold in the winter, and the liquid will be pulled back to the bottom of the casement, where heat supplied to, or taken from, the liquid, through the walls of the copper refrigerant heat transfer line by the circulating refrigerant, will be transferred to the surrounding geothermal soil and/or rock and/or water by means of natural heat convection as the liquid travels to the bottom of the casement. Since the central pipe diameter is relatively large, and since the diameter of the casement is larger than the pipe, frictional efficiency losses will be minimized and efficiencies significantly increased. Further, since the pipe inside the casement is fully insulated, the common "short circuiting" heat transfer effect between the supply and return liquid lines will be substantially eliminated.

The subject invention also discloses a means of providing the warmest water from the bottom of the casement to the exiting portion of the refrigerant traveling to the compressor in the winter, as well as a means of providing the coolest water from the bottom of the casement to the exiting portion of the refrigerant traveling to the interior air handler in the summer, by means of an arrangement of piping and solenoid and/or check valves designed to switch liquid flow direction into and out of the container in a fashion commensurate with the desired refrigerant flow direction in either of the heat pump system's operational heating or cooling modes. Also, a diffuser is incorporated at the entering/exiting portion of the liquid supply/return tubes within the container so as to provide relatively even heat distribution along the refrigerant heat exchange line(s) within the container. This will enhance system efficiencies, as well as help to ensure that the warmest sensible air is provided to the interior conditioned air space in the winter, and that the coolest sensible air is provided in the summer.

As an optional efficiency enhancing supplement, solar heating may be utilized with the system in the winter. A conventional solar heating apparatus is connected in a manner so as to place the solar system's heat sink exchanger within the sealed and fully insulated liquid container. The intense heat from the solar collector will be diluted via the liquid within the container, thereby preventing operational refrigerant pressure extremes. The solar heat sink can be located at any desired point within the container, close to, or away from, the liquid supply line, so as to provide more, or less, solar heat supplement effect directly to the refrigerant fluid circulating within the refrigerant tubing as desired via preferred system operational refrigerant pressures. Any supplemental solar heat not initially absorbed by the refrigerant fluid within the refrigerant tubing will be absorbed by the liquid circulating down the casement, where the surrounding cooler earth will absorb the extra heat, and will act as a heat storage bank for a relatively continuous supplemental heat supply during the night or cloudy days. The solar heating system is enacted by a heat sensor set to engage the solar heater liquid pump when the solar heating system is able to provide heated liquid at a temperature which exceeds the temperature of the available subterranean geothermal heat.

Another type of optional efficiency enhancing solar heating supplement may be utilized with the system in the winter. In this secondary type of solar heating supplement, the solar heat collector would necessarily be located at an elevation below the solar heat sink lines within the container. This secondary type of solar heating would operate in the same manner as the first type described above, with an adjustable solar heat sink location within the container, and with any extra heat being absorbed by the liquid in the container circulating down the casement, except that the solar heating system would operate by means of refrigerant-filled supply and return refrigerant transport lines without the necessity for a liquid pump. The sun would heat the refrigerant fluid in the solar heat collector, vaporizing the refrigerant. The vapor would naturally rise into the solar heat sink tubes within the fluid within the container. The cooler liquid within the container would absorb the heat from the solar heated refrigerant. With the solar heated refrigerant vapor's heat removed by the fluid in the container, the refrigerant would condense back into a liquid, which liquid would be pulled by gravity back down into the solar heat collector, where the process would be continuously repeated until the solar collector was no longer able to supply a greater amount of heat than the sub-surface geothermal heat exchanger, at which point the solar heat collector would be disengaged by means of a heat sensor's signal to close operative solenoid valves, or the like.

A solar heat collector typically requires a minimal amount of electrical energy to operate. Since the solar system's liquid pump will require only a minimal amount of energy to circulate liquid within the pipe and casement, a conventional solar cell/storage battery system, or other renewable energy source, can be utilized to provide this total power requirement. Further, since the compressor unit's power draw for this unique system design will be so low, with a 3 ton system periodically operating on as little as 1.5 kw, the solar cell/battery storage system, or other renewable energy source system such as wind or water, could be enlarged to provide the total system energy requirement.

In the summer, a portion of the outdoors hot gas refrigerant vapor line is immersed in, or channeled through, the condensate water produced by the interior air handler in a manner so as to facilitate evaporative cooling. The condensate water can preferably be gravity fed, or can be directed to the desired location via a conventional condensate water pump, which condensate pump could also be powered by a solar cell system. This optional evaporative cooling segment will serve to take away the most extreme heat prior to the refrigerant entering the container, thereby reducing the cooling load requirements of the subterranean casement.

Except for the optional evaporative cooling segment, insulating material, such as styrofoam or rubatex, is placed around all exposed above-ground system components, and around all sub-surface exposed system components to a point at or slightly beyond the maximum frost line or significant heat line, whichever point is greater. The liquid supply pipe extending to almost the bottom of the casement is fully insulated to prevent a "short circuiting" effect with the surrounding return liquid from the container. Additionally, all other out-of-liquid refrigerant and liquid transport lines, except for the evaporative cooling segment, should be fully insulated.

When using direct expansion or other heat pump interior equipment with minimal elevation and distance differentials, an oil separator would be unnecessary, although other customary direct expansion or other refrigerant system apparatus and materials would generally be utilized, including a receiver, thermal expansion valves, an accumulator, and an air-handler, for example as described in U.S. Pat. No. 5,946,928 to Wiggs, all of which are well-known to those in the trade. If one elected to use conventional air source heat pump equipment, well known to those in the trade, in conjunction with the present invention, which invention would replace the air-source system's exterior fan/coil unit, the air-source system's defrost cycle function must be bypassed or removed.

The subject invention may be utilized as an individual unit, or by means of multiple units connected by tubing in series or in parallel, to increase operational efficiencies and/or to reduce installation costs in a number of applications, such as in, or as a supplement to, a conventional geothermal direct expansion heat pump system and/or a conventional geothermal closed-loop water-source heat pump system, or as a supplement to a conventional air-source heat pump system. The invention may be utilized to assist in efficiently heating or cooling air by means of a forced air heating/cooling system, or to assist in efficiently heating or cooling a liquid, such as water, in a hydronic heating/cooling system. Additionally, the subject invention may be utilized as a heating or cooling source in a mechanical and/or any other system.

Further, the solar heat supplement aspect of the subject invention, in the heating mode, can be successfully and advantageously utilized with virtually any new and existing closed-loop water-source geothermal heating/cooling system, as well as with virtually any new and existing direct expansion geothermal heating/cooling system, whether employing horizontal and/or vertical sub-surface geothermal heat exchange lines.

All closed-loop conventional geothermal heating/cooling systems, whether water-source or direct expansion, which are well understood by those skilled in the art, whether utilizing horizontally and/or vertically oriented sub-surface geothermal heat exchange lines/tubing, must have at least one cooler fluid transport line/pipe/tube, or the like, entering the sub-surface environment to absorb naturally occurring geothermal heat. This geothermal heat is then transported out of the ground via at least one warmer fluid transport line/pipe/tube, or the like, which warmer fluid is utilized as the heat source for the heat pump system's refrigerant compressor, and ultimately as the heat source for the targeted interior heated air and/or water.

Since all such geothermal heat pump systems have at least one cooler fluid transport line/pipe/tube entering the sub-surface environment, and since the sub-surface environment will always act as a thermal storage bank when the entering heat conductive fluid is warmer than the sub-surface environment, as heat always flow to cold, the subject invention's supplemental solar heating aspect may also be successfully employed in any such geothermal heat pump system, so long as the solar heat is preferably added to the heat conductive fluid entering the sub-surface environment when the entering fluid's temperature exceeds that of the sub-surface environment.

In any such application, the full sub-surface geothermal exposure to the supplemental solar heat, in any properly designed geothermal heating/cooling system, will afford sufficient absorption area to prevent excessively high refrigerant pressures entering the system's compressor unit, all while affording increased operating efficiencies and increased supply air temperatures in the winter.

By way of further discussion, in the winter, a means to incorporate available solar heat into the refrigerant fluid of any geothermal direct expansion heating system, and into the water/antifreeze fluid of any geothermal closed-loop water-source system, as a heat source supplement, without any additional system operational power/expense requirement, would always be a positive option and would increase overall system operational efficiencies. Typically, such a supplemental solar heating means (solar heating systems that heat fluids by means of solar radiation are well understood by those skilled in the art), and accompanying parts and equipment, would typically be located on the outside of an exterior structure (an exterior structure being the outside wall, or exterior structure wall, or exterior roof, of a house or of a building, or the like).

While the addition of supplemental solar heat into the refrigerant fluid of a direct expansion system, or into the water/antifreeze fluid of a water-source system, can have certain advantages at any point where the supplemental solar heat would be introduced into the direct expansion system's refrigerant transport fluid lines, or would be introduced into the water-source system's water/antifreeze transport lines, such a solar heat design enhancement would be uniquely appropriate in a geothermal heating system because of the ability of the system's refrigerant, or water/antifreeze, to absorb solar heat in a segment of the refrigerant, or water/antifreeze, transport line immediately prior to the refrigerant's, or water/antifreeze's, entry into the sub-surface geothermal heat exchange means. A segment of a direct expansion heat pump system's refrigerant transport line immediately prior to (or immediately before) the refrigerant's entry into the sub-surface geothermal heat exchange means is herein defined as that segment of a direct expansion heat pump system's refrigerant transport line located between the system's heating expansion valve and the refrigerant's sub-surface geothermal heat exchange area entry point, such segment being well understood by those skilled in the art. A segment of a water-source heat pump system's water transport line immediately prior to (or immediately before) the water's (meaning water and/or antifreeze) entry into the sub-surface geothermal heat exchange means is herein defined as that segment of a water-source heat pump system's water/antifreeze transport line located between the system's refrigerant to water/antifreeze heat exchange means and the water/antifreeze's sub-surface geothermal heat exchange area entry point, such segment being well understood by those skilled in the art.

Absorption of supplemental solar heat at this point will effectively mitigate any excessively hot refrigerant gaseous temperatures prior to any geothermal heat pump system's refrigerant vapor's entry into the system's compressor, which could otherwise cause excessively high refrigerant pressures and/or excessively high compressor discharge temperatures and system short cycling.

The supplemental solar heat will increase the heat content of the direct expansion system's refrigerant, and of the water-source system's water/antifreeze, but since the solar heat is preferably supplied immediately prior to the refrigerant's, or water/antifreeze's, entry into the ground, which ground is the heat source and the evaporator for the direct expansion system in the heating mode, and is the heat source for the water-source system in the heating mode, excessive solar heat will be absorbed by the ground as the refrigerant, or water/antifreeze, travels through the thermally exposed sub-surface refrigerant, or water/antifreeze, transport tubing before reaching the geothermal system's compressor.

This solar heat absorption by the ground will provide two advantages in such direct expansion and/or water-source geothermal heat pump systems. First, the direct expansion system's refrigerant, and the water-source system's water/antifreeze, will be receiving supplemental and warmer heat from the solar collector than from the ground, thereby ultimately providing warmer, but not excessively high, heat to the compressor and to the interior heat exchanger (typically an interior air handler). Second, any excessively high solar heat transferred to the direct expansion system's refrigerant, or to the water-source system's water/antifreeze, will be absorbed by the cooler ground, or other cooler sub-surface material, immediately surrounding the thermally exposed geothermal heat exchange refrigerant, or water/antifreeze, transport tubing, since heat naturally flows to a cooler medium, thereby warming the ground surrounding the geothermal heat exchange tubing.

The warmed ground will act as a thermal storage bank for the stored excess solar heat to be withdrawn from by operation of the direct expansion system, or water-source system, and utilized at night or during cloudy daytime periods, thereby somewhat uniformly increasing interior heat exchange temperatures and geothermal system operational efficiencies, even during periods when the sun's supplemental heat is not available. System operational efficiencies are generally measured in terms of COP, or Co-efficient Of Performance, as is well understood by those skilled in the art. Testing has demonstrated that such supplemental solar heat will materially increase the COP operational efficiencies of a geothermal heat pump heating system.

While a conventional solar heat exchanger, incorporating the use of a fluid circulating pump, which is well understood by those skilled in the art, can always be utilized, as an alternative, to supply heat to the designated refrigerant fluid, or water/antifreeze, the use of a solar heat to refrigerant, or water/antifreeze, system exchange means which would not require the energy expenditure of a solar heating system fluid pump would be preferable in a high-efficiency geothermal heat pump system. Such a design can be accomplished by positioning the solar heat collector at a point below a solar system to refrigerant system heat exchange means, but above the point where the direct expansion refrigerant transport tubing, or water-source water/antifreeze transport tubing, enters the ground. Further, since solar heat collectors typically heat a fluid contained within the solar heating system's closed loop tubing, which fluid is circulated within the tubing to a heat sink, where the heat obtained from the sun is removed from the fluid, with the cooled fluid then circulating back to the solar heat collector to be re-heated and repeat the cycle, as is well understood by those skilled in the art, a solar heating system, which does not require the use of a circulating pump, should have upwardly positioned and vertically oriented tubing within the solar heat collector, and downwardly positioned and vertically oriented tubing within the heat sink, with the heat sink being located above the solar collector.

Positioning the solar heat sink (the solar heat sink is the supplemental solar heating system's heat exchange segment transferring solar heat to the geothermal system refrigerant, or water/antifreeze, entering the sub-surface environment) above the solar collector (so that the use of a solar system circulating pump is unnecessary) can be accomplished by either positioning the solar collector on the ground below the in-coming geothermal to solar heat exchange segment, or by extending the geothermal heat pump system's cooler insulated refrigerant, or water, transport line, intended for entry into the sub-surface environment, up to a point above the solar collector, even if the solar collector is situated on a roof, so that the geothermal to solar heat exchange segment is always above the actual solar heat collector.

Since both warm liquid and warm gas rises, and cooler liquid and cooler gas falls, the tubing in the solar heat collector system would be filled with a fluid, such as a liquid (water and anti-freeze, or the like), a vapor, or a refrigerant fluid, with a refrigerant fluid generally being preferable. As the sun heats the fluid in the solar collector, the warmed fluid will rise to a heat sink comprised of a heat exchange means where the solar fluid transport tubing is in thermal contact with the direct expansion heating system's refrigerant transport tubing, or with the water-source system's cooler water and antifreeze, with such solar system to refrigerant, or water/antifreeze, heat exchange means located at an elevation above the solar heat collector. The solar system to refrigerant, or water/antifreeze, system heat exchange segment means may consist of the solar heat collector's fluid transport tubing coiled around the direct expansion system's refrigerant transport tubing, or coiled around the water-source system's water/antifreeze transport tubing, or the like. Further, in a closed-loop water-source system, solar system to water/antifreeze heat exchange segment may optionally consist of two heat exchange steps, where the solar heat is first conveyed to the water-source system's refrigerant, and where the solar heated refrigerant secondly conveys the supplemental solar heat to the system's water/antifreeze, which water/antifreeze is typically circulated in the sub-surface environment for geothermal heat exchange purposes.

As the heat gained from the sun, via an activated and operating solar heat collector system, is transferred through the direct expansion system's copper refrigerant transport tubing to the direct expansion heating system's refrigerant, or through the water-source system's water/antifreeze transport tubing to the water/antifreeze, by means of the direct expansion system's refrigerant transport tubing, or by means of the water-source system's water/antifreeze transport tubing, being one of directly and indirectly in thermal contact with the solar heat collector's fluid transport tubing, which is a solar heat to geothermal heating system heat exchange means, the solar heat collector's warmer fluid will cool after ultimately transferring its heat to the direct expansion system's refrigerant, or to the water-source system's water/antifreeze, and the cooled solar system's fluid will fall back down into the solar heat collector, by means of the force/operation of natural heat convection gravity, where the solar system's fluid will be heated by the sun and again rise back up to the solar system to geothermal heat pump heating system's heat exchange means, which means is directly attached to the direct expansion system's refrigerant fluid transport line, and is one of directly and indirectly attached (indirectly attached would mean a solar heat to refrigerant to water/antifreeze heat exchange comprising two steps as above described) to the water source system's water/antifreeze transport line, all without requiring the operation/energy expenditure of a solar heat collector fluid circulating pump.

To help insure proper operation of the solar heat to refrigerant fluid, or to water/antifreeze, heat exchange means, without the necessity of a solar system circulator pump, the solar collector's heat transfer tubing should always be sloped upwardly, in a vertical orientation, from the bottom of the solar heat collector to the top of the solar heat to refrigerant fluid, or to water/antifreeze, heat exchange means, so as to easily permit the heated and lighter solar system's fluid to rise via natural heat convection, and the tubing within the solar heat to refrigerant fluid, or to water/antifreeze, heat exchange means should always be sloped downwardly, in a vertical orientation, from the top of the solar heat to refrigerant fluid, or to water/antifreeze, heat exchange means to the bottom of the solar heat collector, so as to easily permit cooled and heavier solar system fluid to fall via force of gravity. Thus, since most heated fluids (whether vapor or liquid) rise, and since most cooled fluids (whether vapor or liquid) fall, the supplemental solar heat to geothermal heat pump system can operate without the need for a solar heating system fluid pump, thereby increasing overall operational efficiencies.

The direct expansion system's refrigerant, or the water-source system's water/antifreeze, which has been warmed by the solar heat, will travel within the direct expansion system's refrigerant heat transfer tubing, or within the water-source system's water/antifreeze transport tubing, down into the ground, where the ground will store excessive heat, generally with some reasonable amount of supplemental solar heat remaining in the direct expansion system's refrigerant as it travels to the system's compressor, or remaining in the water-source system's water/antifreeze as it travels to the system's refrigerant, and ultimately to the system's compressor, where the heat is accentuated and typically sent to the interior air handler (as is well understood by those skilled in the art.

In a preferred direct expansion system design, the solar system to direct expansion system refrigerant heat exchange means, also referred to as a solar heat to refrigerant fluid heat exchange means, will be located at a point in the direct expansion system's liquid refrigerant transport line after the direct expansion system's heating mode refrigerant expansion device and before the point where the direct expansion system's thermally exposed sub-surface refrigerant transport geothermal heat exchange tubing is located, which point is well understood by those skilled in the art. The direct expansion system's heating expansion device will help prevent any refrigerant fluid, which is vaporized via heat from the solar system to refrigerant system heat exchange means, from traveling backwards in a reverse direction through the refrigerant transport tubing by means of the effect of gravity upon lighter refrigerant vapor bubbles within a heavier liquid refrigerant. So as to further assist in preventing solar heated refrigerant vapor bubbles from traveling backwards in a reverse direction, an inverted U bend should preferably be affected by the direct expansion heating system's refrigerant transport line above the solar heat exchange segment before it enters the solar heat exchange segment. The same method should also be utilized if one is initially transferring the supplemental solar heat in a water-source heat pump system to the system's refrigerant, and then to the system's water/antifreeze utilized for geothermal heat exchange.

Likewise, it would also be preferable to utilize an inverted U in the water/antifreeze transport line of a water-source heat pump system, immediately before the water/antifreeze transport line enters the solar to water/antifreeze heat exchange means, so as to prevent vaporized and/or hot water/antifreeze from traveling in the undesired direction.

The solar heat collector's fluid transport lines, to and from the solar heat collector, to the solar system to any geothermal system heat exchange means, should be insulated with rubatex, or the like, as should the exterior of the subject solar system to geothermal system heat exchange means, and as should all other above-ground refrigerant and/or water/antifreeze conduits and valves, excepting, of course, for the actual solar heat collector itself and for the refrigerant transport lines within the interior heat exchange means (typically an interior air-handler). Further, the solar heat collector's entering and exiting solar collector's fluid transport lines should each preferably be equipped with solenoid valves which would close during periods when supplemental solar heat was one of unavailable or undesirable. The operation of solenoid valves, programmed to automatically open and close via pre-set and desired temperature and/or pressure ranges, is well understood by those skilled in the art. Thus, during periods when advantageous solar heat is not available, no significant amount of heat will be lost via a potential reverse transfer of heat from the direct expansion system's refrigerant, or from the water-source system's water/antifreeze, to a cooler solar heat collector. Further, even if solenoid valves were not utilized, or if the valves malfunctioned, as the warmest fluid will always rise, and as all the components other than the actual solar collector are insulated, only minimal heat would be lost the heat pump system's thermal contact with the supplemental solar heating system.

The preferred protection against a potential reverse transfer of heat through the supplemental solar heating system would incorporate the use of pre-set solenoid valves, temperature activated valves, pressure activated valves, solar light activated valves, or the like, which would be installed immediately before and after the subject exterior insulated heat exchange means, as is well understood by those skilled in the art. Solenoid valves, or the like, would be utilized, and would be pre-programmed and set to activate, as a means to terminate/stop the flow of the solar heat collector fluid, both day and night, when a reverse-cycle direct expansion system, or water-source system, was operating in the cooling mode, thus rendering the solar heat collector inoperative during the summer and/or during hot conditions when only cooling mode system operation is desired.

Such solenoid valves, or the like, can additionally be pre-programmed and set to activate as a means to terminate/stop heat transfer from the solar heat collector when a lack of adequate solar supplemental heat is available from the solar heat collector at night or during other periods of lack of adequate solar heat, such as during periods of fog, smog, clouds, or the like. Periods of lack of adequate heat from the solar collector would consist of those periods of time when the temperature of the heat available from the solar heat collector is less than the warmest geothermal sub-surface temperature adjacent to the sub-surface geothermal transport, thermally exposed, heat transfer tubing, or, by way of additional explanation, during those periods of time when the supplemental heat supplied by the solar heat collector is at a lower temperature than the maximum temperature in the geothermal heat exchange sub-surface environment.

The installation, operation, and activation settings of solenoid valves are well understood by those skilled in the art. It is also well understood by those skilled in the art that the solenoid valves would be pre-programmed and set to de-activate when adequate supplemental solar heat was both available and desired, thereby permitting solar heat transfer to the refrigerant of a direct expansion heat pump heating system, or, directly or indirectly, to the water/antifreeze of a water-source heat pump heating system.

In the alternative, should one wish to situate the solar heat collector on a roof, or above the solar system to geothermal system heat exchange means, unless one extended the refrigerant transport line of a direct expansion system, or unless one extended one of the refrigerant transport line and the water/antifreeze transport line of a water-source heat pump system, to a point above the solar heat collector so as to effect a natural convective/gravity solar heat exchange as already described, a conventional solar heat collector fluid circulating pump would be required to circulate the solar heated fluid to the heat exchange means which is in thermal contact with the geothermal fluid transport tubing entering the sub-surface environment, as is well understood by those skilled in the art. If one utilized a common solar heat collector fluid circulating pump, one would also preferably be required to provide the aforesaid protection against a potential reverse transfer of heat, such as solenoid valves, temperature activated valves, pressure activated valves, solar light activated valves, or the like, so as to provide a means to isolate, terminate, and stop the flow of solar heat collector fluid between the solar system and the heat exchange means with the geothermal system during periods when adequate solar heat would not be available, as is also well understood by those skilled in the art.

Even with a solar heat collector fluid circulating pump, solenoid valves, or the like, would preferably be utilized as a means to terminate/stop the convective/gravity flow of the solar heat collector fluid when a reverse-cycle geothermal system was operating in the cooling mode, or when there was an inadequate supply of supplemental solar heat. A solar heat collector is herein defined as a means to acquire naturally occurring heat from the sun, whether by means of collection and/or concentration of solar rays, which means are well understood by those skilled in the art.

Other customary direct expansion heat pump refrigerant system, or water-source heat pump system, apparatus and materials would be utilized in a geothermal system application, such as reversing valves to change the direction of the refrigerant flow (except through the accumulator and compressor) when a reverse-cycle heat pump system is switched from a heating mode to a cooling mode and vice versa, distributors when multiple sub-surface refrigerant, or water/antifreeze, geothermal heat exchange lines are utilized, a thermostat, wiring, controls, refrigerant tubing couplings, insulation (such as rubatex, or the like), a water pump for a water-source system, and an electrical power source, all of which are well-known to those in the art and therefore are not all shown herein.

Such a means to incorporate available solar heat into the refrigerant fluid of a geothermal direct expansion heat pump heating system, and into the water/antifreeze fluid of a geothermal water-source heat pump heating system, as a heat source supplement, whether with a solar heat collector fluid circulating pump, or without any additional system operational power/expense requirement by means of natural heat convection and gravity, as taught herein, would be a positive option and would increase overall system operational efficiencies for new geothermal heat pump system installations, and for existing geothermal heat pump system installations where the supplemental solar heating system could be installed as a retro-fit.

Also by way of further discussion, in the summer, a means to incorporate the water-cooled hot vapor line aspect of the subject invention in the cooling mode can be successfully and advantageously utilized with any geothermal heat pump system, whether direct expansion or water-source.

In any geothermal heat pump system, the water-cooled hot vapor line should preferably be situated at a point exposed to the exterior atmosphere, so as to permit the water vapor to easily escape without returning to add unwanted humidity to the interior, conditioned, air (except in potentially dry desert areas where interior humidity is desirable), all prior to any sub-surface geothermal heat exchange, so as to lessen the heat absorption load on the ground, thereby increasing system operational efficiencies. This means to water-cool the hot vapor line, prior to a geothermal heat transfer line entering the sub-surface environment, is especially advantageous for geothermal cooling system designs because excessive sub-surface heat build-up will drive away heat conductive moisture, and can cause adjacent ground to shrink and pull away from the sub-surface heat exchange tubing, thereby resulting in deficiencies in the sub-surface thermal contact necessary to achieve design heat transfer rates, and resulting in inefficient system operation.

As previously disclosed, the water for the water-cooled hot vapor line may come from the heat pump system's condensate water. However, since such a water-cooled vapor line would increase any geothermal heat pump system's operational efficiencies, if the condensate water should prove to be an insufficient source of supply, the condensate water could be supplemented or replaced with water from any source, such as a municipal water supply, a well, rainwater, or the like. A water-level sensing valve and/or float, as is well understood by those skilled in the art, could be installed to insure an adequate supply of water was furnished to maintain an optimum supply for such evaporative purposes. Further, an appropriate drain would be supplied to remove any excess water supply to the evaporative cooling segment, as is well understood by those skilled in the art.

In order to increase the efficiency of a water-cooled hot refrigerant vapor line within a small segment of the vapor line, the size of the segment of refrigerant vapor line exposed to the cooler water should be expanded, so as to provide more refrigerant hot vapor fluid transport tubing surface area. For example, if the normal hot vapor transport tubing design size for a system was ⅞ inch diameter, the tubing within the water-cooled segment could be enlarged with an expanded surface area to a 1.5 inch diameter, or the like. Further, when advantageous, the tubing within the water-cooled segment could be both enlarged and flattened so as to provide a shallower water containment half-pipe, or tray segment, or the like.

Such a means to incorporate a water-cooled hot vapor line segment into one of a geothermal direct expansion heat pump cooling system and a geothermal closed-loop water-source heat pump cooling system, as a cooling mode supplement, would be a positive option and would increase overall system operational efficiencies for both new geothermal heat pump system installations, and for existing geothermal heat pump system installations where the supplemental water-cooled hot vapor line segment could be installed as a retro-fit.

BRIEF DESCRIPTION OF THE DRAWINGS

There are shown in the drawings embodiments of the invention as presently preferred. It should be understood, however, that the invention is not limited to the simple and precise exemplary arrangements and instrumentalities shown in the drawings, wherein.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. It is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure or system. The various features and advantages of the present invention may be more readily understood with reference to the following detailed description taken in conjunction with the accompanying drawings.

Figure 1:
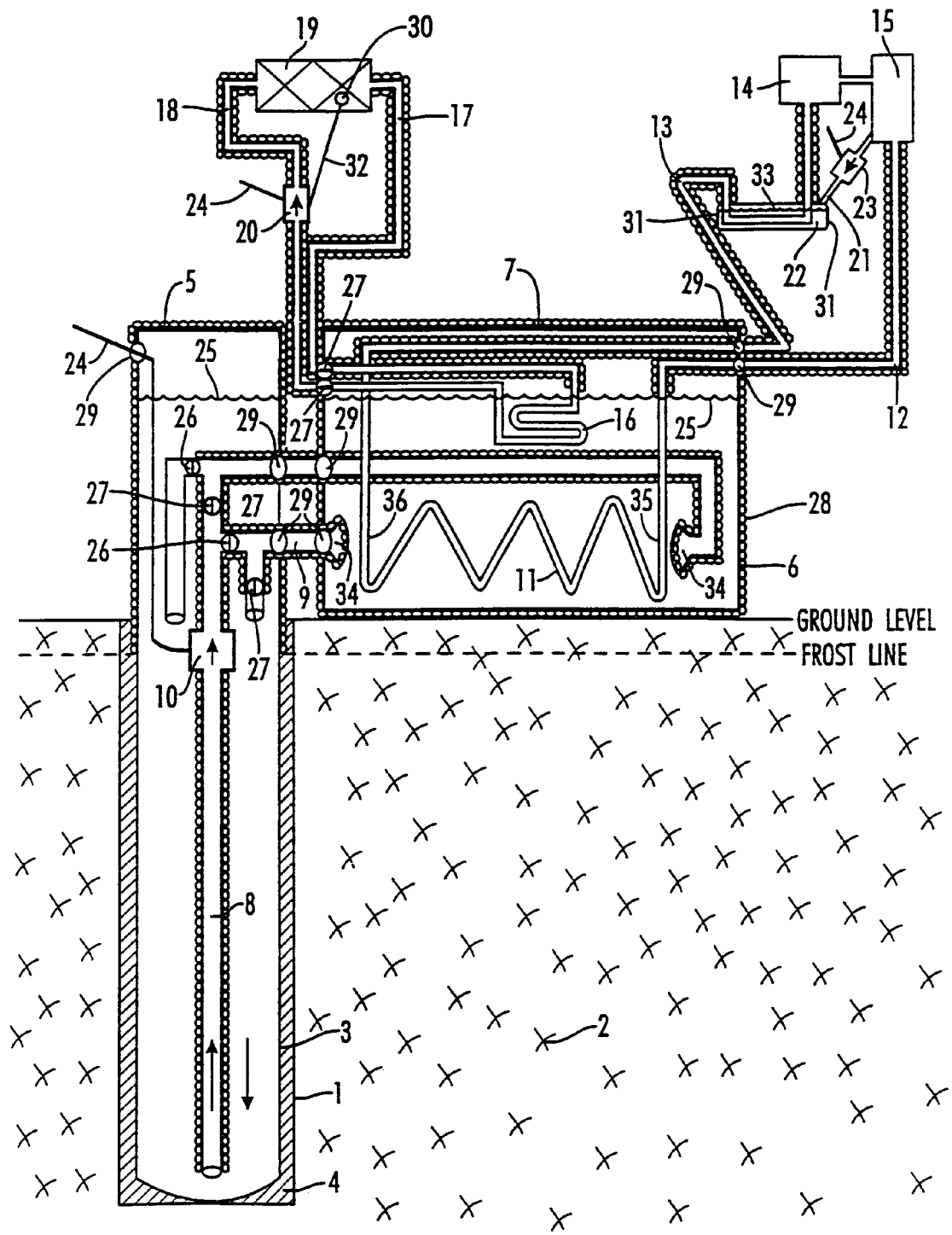
FIG. 1 shows a side view of a borehole in the ground containing a mostly liquid-filled sealed casement, together with an above-ground insulated sealed liquid container. An insulated liquid supply pipe extends from near the bottom of the casement to the container, where refrigerant transport heat transfer line is located, together with a liquid return pipe. Liquid is circulated, by means of a pump, from the bottom of the casement, over the refrigerant heat transfer line in the container, and back into the top of the casement where it either absorbs or rejects heat on its way back to the bottom of the casement by means of thermal contact with the sub-surface conditions surrounding the casement. An optional supplemental solar hot liquid heating system is shown being incorporated into the system with solar heat transfer lines extended into the container. An optional supplemental evaporative cooling system is shown by means of immersing the hot gas refrigerant vapor line in a container filled by condensate water produced by the interior air handler, with refrigerant being circulated within geothermal heat pump refrigerant tubing by means of a compressor unit. An insulation material is used to completely insulate all areas of the system where thermal conductivity is not desirous, such as the above-ground portion of the casement, the entire container, the entire liquid supply pipe, and all fluid and liquid transport lines exposed to the air except for the evaporative cooling segment. The system also incorporates a piping and valve structure designed to reverse directions of the liquid supply and return pipes, to and from the container, commensurate with the reverse directional flow of refrigerant when switching from a cooling mode to a heating mode and vice versa.

Referring now to the drawings in detail, where like numerals refer to like parts or elements, there is shown in FIG. 1 a side view of a borehole 1 in the ground 2, with a fully sealed casement 3 inserted within the borehole 1, with a thermally conductive fill material 4, such as thermal grout, filling the space between the walls of the borehole 1 and the casement 3. The borehole 1 may be eight and one-half inches in diameter, and the casement 3 may be six inches in diameter, for example, with the borehole 1 and inserted casement 3 extending to an approximate depth of 50 to 500 feet, or more, depending on the amount of heat desired to be extracted from, or rejected into, the surrounding earth or ground 2.

The casement 3 is sealed at the top with a cap 5. The casement 3 is shown as being located above-ground, but can be located below-ground, or partially below-ground if desired. In other embodiments, the casement 3 can be placed in water, or water and anti-freeze, partially or fully submerged. Thus, references herein to a sub-surface placement of the casement 3 are intended to refer to positioning of some or all of casement 3 below ground or below water surface level, such that at least a portion of the casement 3 is in thermal contact with an adjacent sub-surface material.

The casement 3 has access holes 29 for a liquid, such as water or a water and antifreeze mixture, liquid supply pipe 8, which supply pipe 8 is fully insulated 28 and open-ended. The casement 3 also has access holes 29 for an open-ended liquid return pipe 9, together with an access hole 29 for an electrical power cord 24 to power the liquid pump 10. The liquid pump 10 shown is a submersible liquid pump 10 located below the liquid line level 25 in the casement 3 so as to be self-priming. However, since the liquid pump 10 is located near the top portion of the casement 3, virtually any form of conventional liquid pump 10 could be utilized. The liquid supply pipe 8, and the relatively short liquid return pipe 9, may consist of a two and one-half inch diameter PVC pipe, for example, with the entire liquid supply pipe 8 completely surrounded by one-half to one-inch thick insulation 28 material. The relatively large diameter liquid supply pipe 8, together with the extra-large diameter, six inches for example, of the casement 3, through which casement 3 the liquid returns to the bottom, greatly reduces liquid head pressures caused by smaller diameter wall friction, as exists in most conventional designs.

Adjacent to the casement 3, a container 6 is located. The container 6 is comprised of a liquidtight vessel, such as a large plastic tub, with an access container lid 7 at the top. The container 6 has access holes 29 for supply and return liquid pipes 8 and 9, for refrigerant supply (liquid) and return (vapor) lines 12 and 13, and for solar liquid supply and return lines 17 and 18.

The refrigerant liquid line 12 and a refrigerant vapor line 13, are shown entering/exiting the casement 3 through access holes 29, and being connected to respective first and second end portions 35 and 36 of a refrigerant heat exchange line 11 below the liquid level line 25 in the container 6. The refrigerant liquid line 12 may consist of, for example, a ½ inch diameter copper line, and the refrigerant vapor line 13 may consist of a ⅞ inch diameter copper line, for example. The refrigerant heat exchange line 11 below the water line 25 in the container 6, which is connected to the refrigerant liquid line 12 and vapor line 13, may consist of one or more tubes, such as copper tubing, which will adequately effect heat transfer in liquid, such as one or more extended 1 inch, or ⅞ inch, or ½ inch, or ¼ inch, or ⅛ inch, finned or unfinned, tubes, or the like. Liquid is circulated over the refrigerant heat exchange line 11 within the container 6 by means of a liquid pump 10 situated below the liquid level line 25 connected to the supply pipe 8 within the casement 3. An electric power cord 24 extends from the liquid pump 10 through an access hole 29 in the casement 3 to a power source, such as a conventional wall outlet (not shown), or to some other electrical power source, such as a natural/renewable wind, solar, or water, energy power source, or the like. The heat conductive liquid is distributed to the refrigerant heat exchange line 11 by some form of diffuser 34, such as a trumpet style, with a series of uniformly spaced holes in the end, diffuser 34, as shown, or the like, so as to distribute the liquid, supplied from near the bottom of the casement 3, over the refrigerant heat exchange line 11 in a relatively even manner.

The liquid supply pipe 8 and the liquid return pipe 9 are shown as respectively connecting below the liquid level line 25 in both the casement 3 and the container 6, so as to avoid any air pockets or liquid pump 10 priming issues. However, the liquid supply and return pipes, 8 and 9, could easily be constructed to enter and exit the casement 3 and the container 6 from the top (not shown), and filled/primed with liquid, if desirable so as to avoid having to liquid-tight seal access holes 29 in the sides of the casement 3 and the container 6.

The system is shown as operating in the cooling mode. Consequently, the coolest liquid from the bottom of the casement 3 is shown as flowing through the liquid supply pipe 8 into the container 6, directly in front of a first end portion 35 of the submerged heat exchange line 11 which is transporting cooled refrigerant through refrigerant liquid line to an interior air handler unit 15, where the cooled refrigerant absorbs and removes heat from the interior air via flowing through conventional finned copper tubing (not shown since well understood by those skilled in the trade). The liquid flowing along the heat exchange line 11, within the container 6, absorbs heat from the hot refrigerant fluid being circulated by the compressor unit 14 inside the heat exchange line 11. The heated fluid exits into the top of the casement 3 by means of the liquid return pipe 9. As the heated liquid is pulled along the side walls of the casement 3, in direct proximity to the fill material 4 and ground 2, the heat is absorbed and removed by naturally occurring thermal contact with cooler geothermal ground temperatures. The liquid is pulled down along the side walls of the casement 3, by means of the liquid flow necessitated by the liquid pump 10 pulling cooled liquid up from the bottom of the casement 6 through the supply pipe 8.

In a reverse-cycle heating/cooling system, a series of solenoid valves and/or check valves in the compressor unit 14, which are well known to those skilled in the trade and are not shown herein, operate to reverse the direction of the refrigerant flow, except through the actual compressor (not shown), when switching from a cooling mode to a heating mode and vice versa. It would be preferable for the liquid supply pipe 8 to be constructed in a manner so as to always, in a cooling mode, discharge the supply liquid acquired from the bottom of the casement 3, which will generally be the coolest liquid in the summer, proximate the first end portion 35 of the refrigerant copper heat exchange line 11, and, in a heating mode, to discharge the supply liquid acquired from the bottom of the casement 3, which will generally be the warmest liquid in the winter, not taking into account the optional solar supplement in the winter daytime, proximate second end portion 36 of the refrigerant heat exchange line 11 in both a single-cycle and a reverse-cycle heating/cooling system. To accomplish this objective in a reverse-cycle system, the liquid flow through the supply pipe 8 and the return pipe 9, located within the container 6, should be reversed as the refrigerant flow reverses direction within the heat exchange line 11 when switching from a cooling mode to a heating mode and vice versa. This will provide maximum system heating and cooling efficiencies as the warmed refrigerant travels to the compressor unit 14 in the winter, and as the cooled refrigerant travels to the interior air handler unit 15 in the summer. To accomplish this reverse direction liquid flow into and out of the container 6, a simple arrangement of piping and of check valves and of solenoid valves could be utilized near the liquid pump 10, which will always be pumping liquid up from the bottom of the casement 3 in the same direction, as readily understood by those skilled in the art.

As one example of a piping arrangement enabling a reversible liquid flow direction within the container 6, to correspond with the directional flow of the refrigerant within the heat exchange line 11 as the refrigerant flow direction reverses when changing from a cooling mode to a heating mode, supply and return pipes, 8 and 9, are shown as being located above the liquid pump 10, extending out of and into the casement 3 and extending back into and out of the container 6. In the cooling mode, two "A" closed solenoid valves 26 are respectively installed on the supply and return pipes, 8 and 9, above the liquid pump 10 as shown, with the two "B" open solenoid valves 27 respectively installed on the supply and return pipes, 8 and 9, above the liquid pump 10 as shown. Liquid will be pulled up from the bottom of the casement 3 by the liquid pump 10, which will always operatively pump liquid in the same direction up from the bottom of the casement regardless of the direction of the supply and return liquid to and from the container 6. When operating in the heating mode, the two "A" solenoid valves 26 are respectively opened (not shown), and the two "B" solenoid valves 27 are respectively closed (not shown), thereby reversing the directional flow of the liquid within the container so as to maximize the heating effect to the returning portion of the heat exchange line 11. The "A" and "B"

solenoid valves, 26 and 27, are connected to a control unit (not shown) by solenoid valve wires (not shown), as readily understood by those skilled in the art, so as to respectively open and close the "A" and "B" solenoid valves, 26 and 27, when switching from a cooling mode to a heating mode, and vice versa. When the supply and return pipes, 8 and 9, are installed in a reverse operational mode, as described above, all such pipes, 8 and 9, should be fully covered with insulation material 28, such as rubatex, or the like.

An optional supplemental solar heating method is shown as being incorporated into the system. A conventional solar heat collector 19 is placed on a roof (not shown), or in another convenient location, exposed to the sun (not shown). A solar heat liquid transfer supply line 17 and return line 18 will transfer a liquid, such as water and anti-freeze, from and to the solar heat collector 19 and to and from the solar heat sink lines 16 situated below liquid level 25 in the container 6. The solar heating system liquid is circulated by means of a solar system liquid pump 20, receiving power from an electrical power cord 24 connected to either a conventional power source or to some other natural/renewable energy electrical power source. The solar heat liquid transfer supply line 17 and return line 18 are shown as being covered with insulation material 28 so as to preserve any extra heat gained from the solar heat collector 19 entirely for the heat conductive liquid below the liquid level line 25 in the casement 3. While the solar heat sink lines 16 are shown as located below the liquid level 25 in the center of the container 6, the solar heat sink lines 16 can be moved to a location either closer to, or farther from, the exiting portion of the copper heat exchange line 11, which is carrying refrigerant to the refrigerant vapor line 13 in the winter, depending on the system operational refrigerant pressures desired. The solar heating method would be engaged by a temperature sensor 30 connected to the solar heating system's liquid pump 20 by means of a wire 32 of sufficient capacity to transmit on/off signals. The on signal would be transmitted only when the solar heating unit can provide heated liquid in excess of some pre-determined temperature, greater than the sub-surface geothermal temperature, such as a temperature in excess of 60 degrees F. in many locations. When the solar heating method is unable to provide heated liquid at the minimum pre-determined temperature, the off signal would be transmitted by the sensor 30 to the solar system's liquid pump 20, so as not to take heating capacity away from the primary natural geothermal heat source in the ground 2 or sub-surface. Open solenoid valves 27 are shown, to show the supplemental solar heating method in operation. Such open solenoid valves 27 would be closed (not shown) during periods when supplemental solar heat was not advantageous so as to prevent the loss of heat from the primary geothermal heating system, by means of natural thermal convection, to the then cooler solar heat collector 19.

While operating in the cooling mode, the system is shown with a condensate water pump 23 transferring water from an interior heat exchanger, such as interior air handler 15, through a water condensate drain line 21 into a half-pipe 22, located outdoors, through which an un-insulated portion of the refrigerant vapor line 13 runs on its way from the air handler 15 to the container 6. The half-pipe 22 has sealed ends 31 so as to contain the condensate water. The condensate water, being in direct proximity with, and typically covering, the hot refrigerant vapor line 13 in the half-pipe 22, will absorb heat from the hot refrigerant within the vapor line 13 and will evaporate into the exterior air, thereby removing heat from the refrigerant and lessening the heat removal load on the rest of the geothermal system. The evaporative cooling system shown, as with other disclosed elements of this subject invention, is not intended in a limiting fashion, as other analogous evaporative cooling means may be utilized via utilization of condensate water so as to lessen the load on the rest of the geothermal system. Although not shown in the drawings, in the winter, the exposed portion of the hot gas refrigerant vapor line 13, located within the half-pipe 22, would be fully covered with an insulation material 28, such as rubatex, or the like. Condensate water from a de-humidifier (not shown), or other means for accomplishing interior heat exchange, could also be utilized in a similar manner to remove heat from the hot gas vapor refrigerant line 13, for evaporative cooling purposes, prior to the hot refrigerant entering the container 6 and being cooled by primary geothermal means as described herein. A conventional de-superheater (not shown) may also be incorporated into the system. A de-superheater typically circulates water from the interior hot water tank around the hot refrigerant vapor line so as to transfer heat from the refrigerant to the interior hot water supply, typically significantly reducing hot water heating expenses. Utilization of a de-superheater in the cooling mode would also serve to lessen the heat removal load on the rest of the geothermal system.

Instead of heating and cooling air, the subject invention could alternatively be utilized to heat and cool a liquid, such as water, in a hydronic heating/cooling system, or could be utilized for hot water generation purposes only. In such a hydronic/hot water application only, the conventional air handler unit 15 would be replaced with a conventional water heat exchange unit (not shown) similar to a de-superheater, as would readily be understood by those skilled in the art.

Insulation materials 28, which are to be utilized to surround all portions of the subject system where thermal conductivity is not desirous, are well known and include, but are not limited to, insulation materials 28 such as fiberglass, styrofoam, rubatex, and the like, all of which are well known to those in the trade. The entire liquid supply pipe 8, and the entire container 6 should be fully covered with insulation material 28, as should all system liquid and fluid transport pipes and lines, 8, 9, 12, 13, 17, and 18, exposed to the air, excepting the evaporative cooling segment of the hot gas refrigerant vapor line 13 within the half-pipe 22 in the summer.

Figure 2:
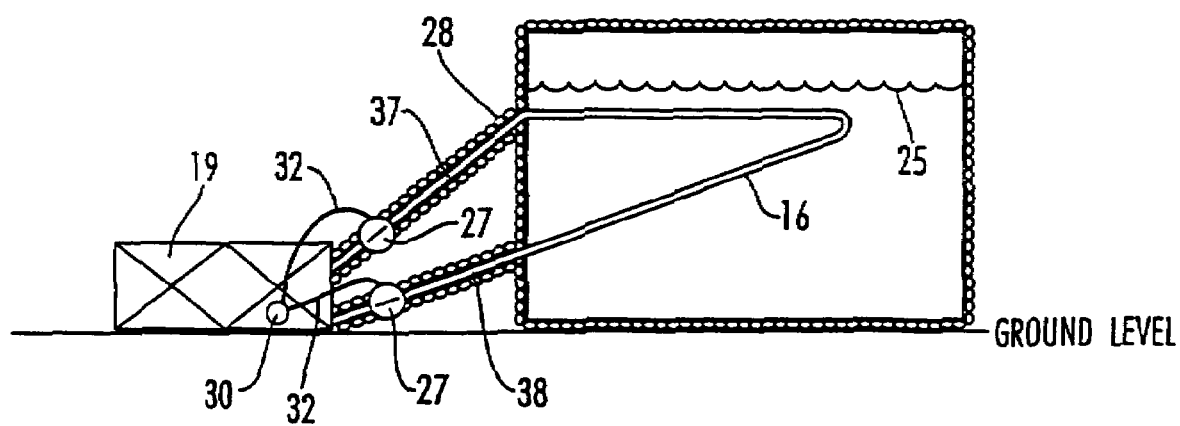
FIG. 2 shows a side view of a refrigerant fluid operative solar heating system which supplies heat to liquid in the mostly liquid-filled container of FIG. 1, without showing the other system components of FIG. 1.

FIG. 2 shows a side view of a secondary optional supplemental solar heating method as being incorporated into the system. A conventional solar heat collector 19 is placed on the ground below the liquid level 25 in the container 6, or at another convenient location below that of the liquid level 25 in the container 6, with the solar heat collector 19 exposed to the sun (not shown). A solar heat fluid transfer supply line 37 and return line 38 will transfer a fluid, such as a refrigerant fluid, from and to the solar heat collector 19 and to and from the solar heat sink lines 16 situated below liquid level 25 in the container 6. The liquid is circulated by means of naturally occurring refrigerant properties, whereby refrigerant heated by the sun evaporates (vaporizes) and naturally rises into the solar heat sink lines 16. Since the solar heat sink lines 16 are located below the colder liquid level 25 in the container 6, the refrigerant will condense into a liquid, which gravity will pull back down into the solar heat collector 19, where the process will be continuously repeated as long as the sun provides adequate heat. The solar heating system's phase change is effected by a correct refrigerant charge and pressure, as is understood by those skilled in the art. The solar heat refrigerant vapor transfer supply line 37 and refrigerant liquid return line 38 are shown as being covered with insulation material 28 so as to preserve any extra heat gained from the solar heat collector 19 entirely for the heat conductive liquid below the liquid level line 25 in the casement 3. While the solar heat sink lines 16 are shown as located below the liquid level 25 in the center of the container 6, the solar heat sink lines 16 can be moved to any location within the container 6, depending on the primary system's operational pressures desired, as explained in the detailed description of FIG. 1 hereinabove. The solar heating method would be engaged by at least one open solenoid valve 27, although two such open solenoid valves 27 are shown, so as to avoid having to insulate the solar heat collector 19 when it is inoperative. The on signal would be transmitted to open the solenoid valves 27, by means of sensor wires 32 connected to a solar temperature sensor 30, only when the solar heating unit can provide heated liquid in excess of some pre-determined temperature, greater than the sub-surface geothermal temperature, such as a temperature in excess of 60 degrees F. in many locations. When the solar heating method is unable to provide heated liquid at the minimum pre-determined temperature, the off signal would be transmitted by the sensor 30 to the solar system's solenoid valves 27, so as to close them (not shown), so as not to take heating capacity away from the primary natural geothermal heat source in the ground 2 or sub-surface.

Figure 3:
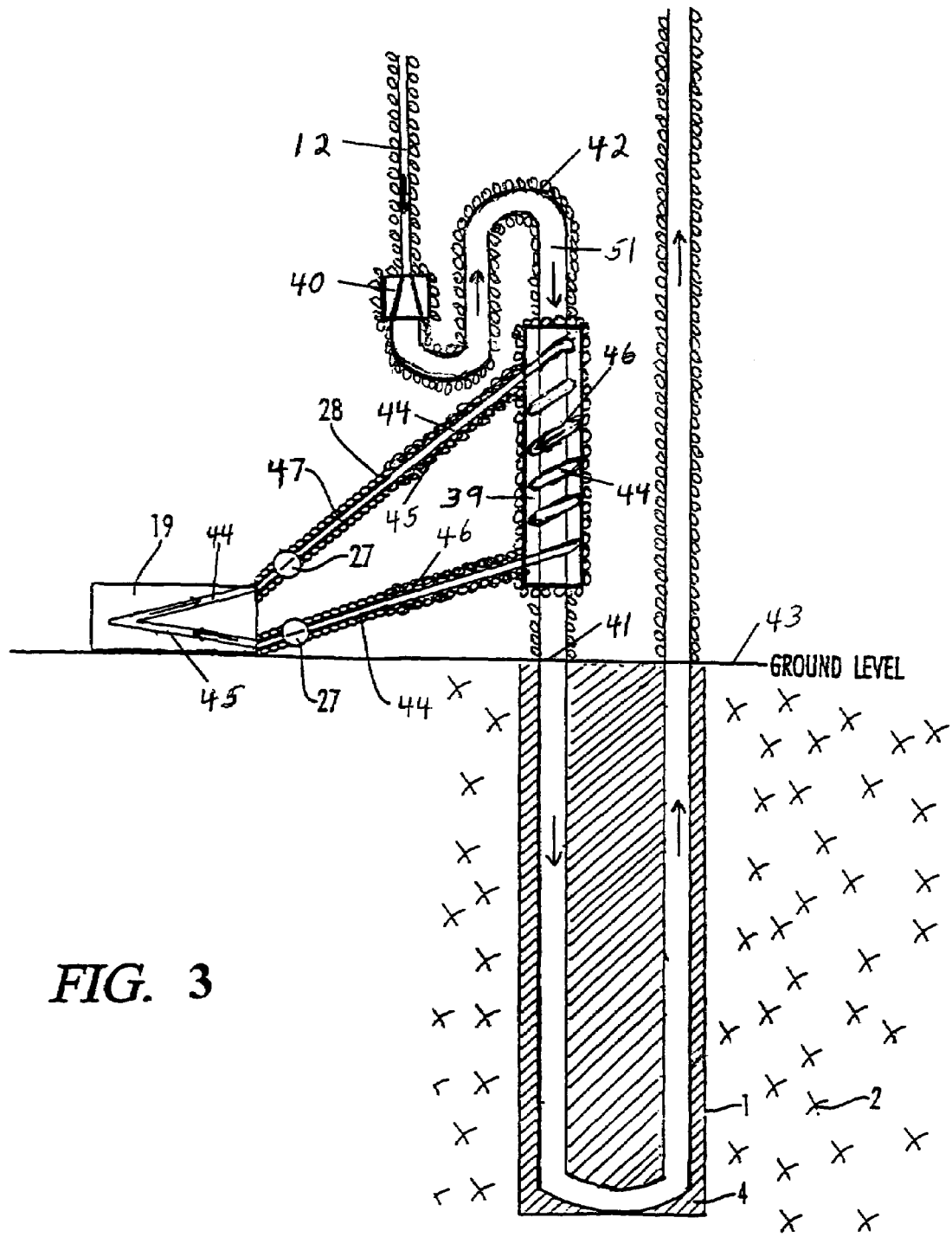
FIG. 3 shows a side view of an optional supplemental solar heat collector that can be effectively utilized for any direct expansion geothermal heat pump system, either in a new installation or as a retrofit in an existing installed system, where the solar fluid transport tubing is upwardly and downwardly vertically oriented so as to promote natural thermal heat convection without the need for a solar system fluid pump, where the solar heat is added to the refrigerant fluid in a location subsequent to the refrigerant system's heat expansion valve and prior to the refrigerant's entry into the sub-surface geothermal heat transfer area, and where an inverted U bend is incorporated in the refrigerant line before it enters the solar heat collector so as to assist in inhibiting vaporized refrigerant from traveling in the wrong direction.

FIG. 3 is a side view of an optional supplemental solar heat collector 19 that can be effectively utilized for any direct expansion geothermal heat pump system, either in a new installation or as a retrofit in an existing installed system. A basic operational design of a solar heat collector 19 has already been described in the above detailed drawings, including the operation of open solenoid valves 27, which would be closed to block the flow of solar heat transport fluid by means of natural convection when operation of the solar heat collector 19 would not be advantageous.

Regarding a direct expansion heat pump heating system application, the design of positioning the solar heat to refrigerant fluid heat exchange means 39 between the direct expansion system's heating mode refrigerant expansion device 40 and before the point 41 where the direct expansion system's thermally exposed sub-surface refrigerant transport geothermal heat exchange tubing is located (typically at or below the ground surface level 43) is shown herein. The direct expansion heating system's refrigerant liquid line 12 is shown as situated before the heating system's refrigerant fluid enters the refrigerant expansion device 40, all of which are shown as surrounded by insulation materials 28.

Also shown, regarding a direct expansion heat pump system application, is an inverted U bend 42 in the heat pump system's refrigerant fluid transport line 51, (a direct expansion heat pump system's fluid transport line 51 contains a refrigerant, such as R-22, R-410A, or the like) above and before the solar heat to refrigerant fluid heat exchange means 39, so as to help prevent any vaporized refrigerant from moving in an unwanted reverse direction within the heat pump's system's fluid transport line 51 by means of vapor bubbles being lighter than liquid. The heat pump's system's fluid transport line 51 transports the heat pump system's refrigerant fluid (not shown herein) to and through the solar heat to refrigerant fluid heat exchange means 39 on its way to exchange heat with the naturally occurring temperatures existing below the ground surface level 43 in the ground 2.

Additionally, so as to assist in avoiding the necessity for a solar system fluid or water pump (20 in the prior detailed drawing number 1, but not shown here), the solar heat collector's 19 solar fluid transport tubing 44, situated within the solar heat collector 19, is shown as sloped in an upward vertical orientation 45, so as to easily permit the fluid warmed by the sun to rise, and the solar fluid transport tubing 44, situated within the solar heat to refrigerant fluid heat exchange means 39, is shown as sloped in a downward vertical orientation 46, so as to easily permit the fluid cooled, by means of heat transfer to the direct expansion system's refrigerant fluid, to fall. Likewise, and for similar reasons, the solar fluid (the solar fluid, not shown herein, can be one of a liquid and a vapor, depending on system design) transport tubing 44 fluid supply line 47, located between the solar heat collector 19 and the solar heat to refrigerant fluid heat exchange means 39, is shown as extended and sloped in an upward vertical orientation 45, and the solar fluid transport tubing 44, located between the solar heat to refrigerant fluid heat exchange means 39 and the solar heat collector 19, is shown as extended and sloped in a downward vertical orientation 46. Thus, the solar fluid transport tubing 44 entering the solar heat collector 19 is below the elevation of the solar fluid transport tubing 44 exiting the solar heat to refrigerant fluid heat exchange means 39.

All the solar fluid transport tubing 44 extending between (to and from) the solar heat collector 19 and the solar heat to refrigerant fluid heat exchange means 39 is surrounded by insulation material 28. The exterior of the solar heat to refrigerant fluid heat exchange means 39 is surrounded by insulation material 28.

An open solenoid valve 27 is shown as being located in each of the solar fluid transport tubes 44 located between the solar heat collector 19 and the solar heat to refrigerant fluid heat exchange means 39. These solenoid valves 27 can be programmed (as is well understood by those skilled in the art) so as to provide a means to terminate/stop heat transfer from the solar heat collector 19 when the geothermal heating/cooling system is operating in the cooling mode and when there is a lack of adequate solar supplemental heat available at night or during other periods when the supplemental heat supplied by the solar heat collector 19 is at a lower temperature than the maximum temperature in the geothermal heat exchange sub-surface environment. The solenoid valves 27, which act as a solar heat transfer termination means, are simply de-activated and opened when adequate supplemental solar heat is both available and desired.

For additional system illustration, the heat pump system's refrigerant fluid transport line 51 is shown as extending beneath the ground surface level 43, within a well/borehole 1 drilled into the ground 2, with the remaining interior portion of the well/borehole 1 being filled with a fill material 4, such as a heat conductive grout, or the like.

Figure 4:
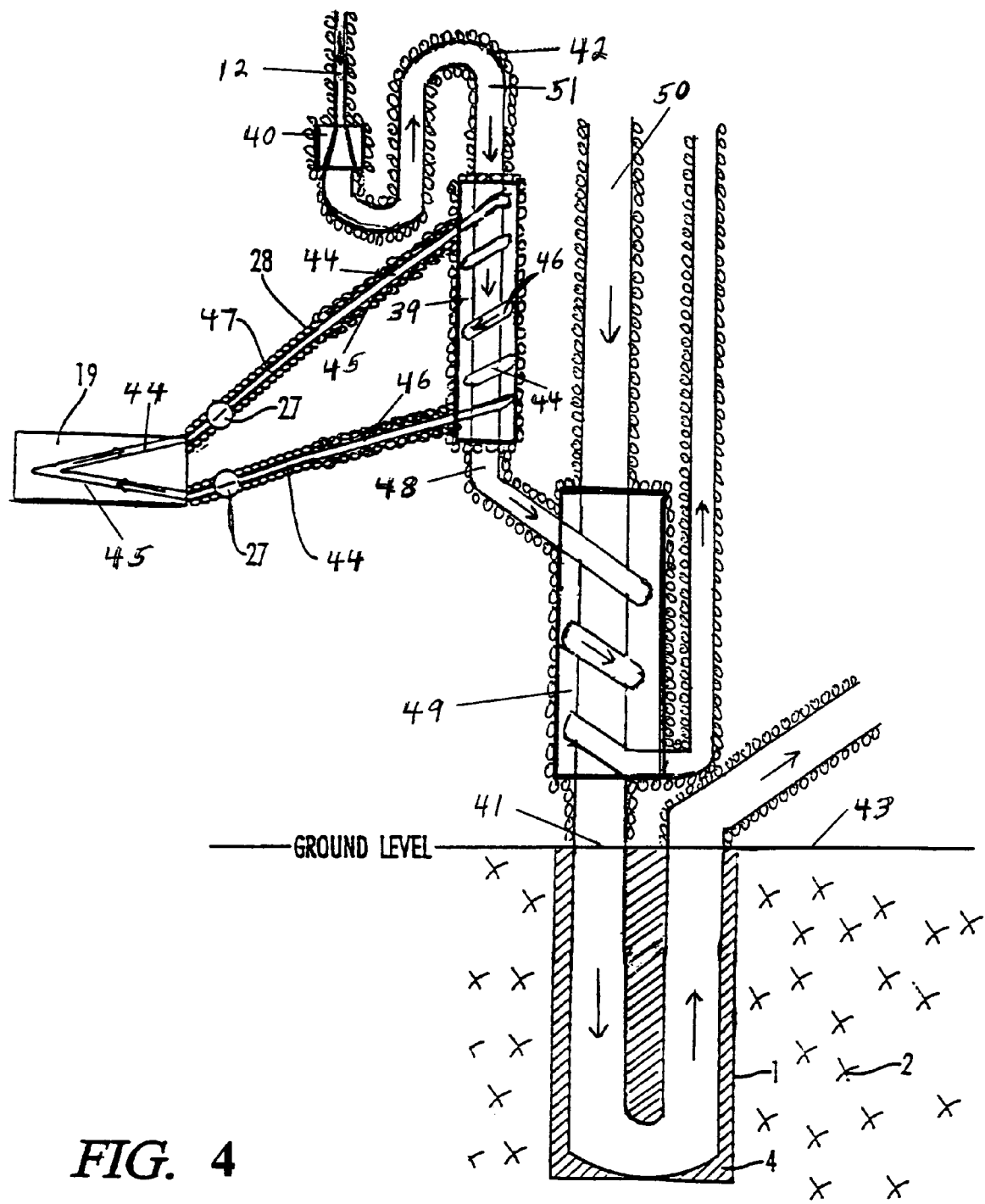
FIG. 4 is a side view of a supplemental solar heating system where solar heat is transferred to a refrigerant fluid in a manner similar as shown in FIG. 3 above, but where, in a closed-loop geothermal water-source heat pump system, the solar heat collector is operatively connected, by means of solar fluid transport tubing, to a solar heat to refrigerant fluid heat exchange means, and where the heated refrigerant transport line is next operatively connected to a refrigerant to water/antifreeze fluid heat exchange means prior to the water/antifreeze fluid entering the sub-surface geothermal heat exchange environment.

FIG. 4 is a side view of a simple illustration of a supplemental solar heating system where, in a closed-loop geothermal water-source heat pump system, the solar heat collector 19 is operatively connected, by means of solar fluid transport tubing 44, to a solar heat to refrigerant fluid heat exchange means 39, and where the heated refrigerant transport line 48 is operatively connected to a refrigerant to one of water and water and antifreeze (water/antifreeze) fluid heat exchange means 49. One of a water and a water and antifreeze (water/antifreeze) fluid transport line 50 is shown as entering and exiting the refrigerant to water/antifreeze fluid heat exchange means 49, on its way to the sub-surface geothermal heat exchange environment located beneath the ground surface level 43. The operation of a refrigerant to water/antifreeze fluid heat exchange means 49 is well understood by those skilled in the water-source heat pump art, and, therefore, is not shown in any additional detail herein. It is important to note that the solar heat collector 19 is shown as being located below the solar heat to refrigerant fluid heat exchange means 39 (herein being defined and meaning the solar fluid transport tubing 44 entering the solar heat collector 19 is below the elevation of the solar fluid transport tubing 44 exiting the solar heat to refrigerant fluid heat exchange means 39), so as to assist in avoiding the necessity of a solar system fluid pump (20 in drawing number 1 hereinabove, but not shown herein).

By way of further illustration, so as to assist in avoiding the necessity for a solar system fluid or water pump (20 in the prior detailed drawing number 1, but not shown here), the solar heat collector's 19 solar fluid transport tubing 44, situated within the solar heat collector 19, is shown as sloped in an upward vertical orientation 45, so as to easily permit the fluid warmed by the sun to rise, and the solar fluid transport tubing 44, situated within the solar heat to refrigerant fluid heat exchange means 39, is shown as sloped in a downward vertical orientation 46, so as to easily permit the fluid cooled, by means of heat transfer to the direct expansion system's refrigerant fluid, to fall. Likewise, and for similar reasons, the solar fluid (the solar fluid, not shown herein, can be one of a liquid and a vapor, depending on system design) transport tubing 44 fluid supply line 47, located between the solar heat collector 19 and the solar heat to refrigerant fluid heat exchange means 39, is shown as extended and sloped in an upward vertical orientation 45, and the solar fluid transport tubing 44, located between the solar heat to refrigerant fluid heat exchange means 39 and the solar heat collector 19, is shown as extended and sloped in a downward vertical orientation 46. Thus, the solar fluid transport tubing 44 entering the solar heat collector 19 is below the elevation of the solar fluid transport tubing 44 exiting the solar heat to refrigerant fluid heat exchange means 39.

Also, the solar heat to refrigerant fluid heat exchange means 39 is situated after the refrigerant expansion device 40, is situated before the refrigerant to water/antifreeze fluid heat exchange means 49, and is situated before the heat pump system's water/antifreeze fluid transport line 50 travels below ground surface level 43. The water-source heat pump's heating system's refrigerant liquid line 12 is shown as situated before the heating system's refrigerant fluid enters the refrigerant expansion device's 40, all of which are shown as surrounded by insulation materials 28.

However, once the supplemental solar heat has been transferred to the refrigerant in this particular water-source heat pump transfer application, where the solar heat is initially transferred to the water-source heat pump's heating system's refrigerant (not shown herein), rather than initially to the water-source heat pump's heating system's water/antifreeze (not shown herein), the refrigerant to water/antifreeze fluid heat exchange means 49 can be located at any convenient elevation, since the refrigerant is circulated by means of the system's compressor unit (not shown herein), since the one of water and water and antifreeze are circulated by means of the water-source heat pump system's geothermal liquid fluid circulating pump (not shown herein), and since neither of these water-source geothermal heating system fluids are dependent on natural heat convection to achieve design circulation. Both water-source heat pump system compressors and geothermal liquid fluid circulating pumps are well understood by those skilled in the art. The ultimate process of transferring the supplemental solar heat to the water/antifreeze fluid of the water-source heat pump is shown as occurring before the circulating water/antifreeze travels past and beneath a point at ground level 41.

An inverted U bend 42 is shown in the in the heat pump system's refrigerant fluid transport line 51 (a water-source heat pump system's refrigerant fluid transport line 51 contains a refrigerant, such as R-22, R-410A, or the like), above and before the solar heat to refrigerant fluid heat exchange means 39, so as to help prevent any vaporized refrigerant from moving in an unwanted reverse direction within the heat pump's system's refrigerant fluid transport line 51 by means of vapor bubbles being lighter than liquid. The heat pump's system's refrigerant fluid transport line 51 transports the heat pump system's refrigerant fluid (not shown herein) to and through the solar heat to refrigerant fluid heat exchange means 39 on its way to exchange heat with the water/antifreeze (not shown herein) circulating within the water/antifreeze fluid transport line 50. Thereafter, the water/antifreeze travels within the water/antifreeze fluid transport line 50 beneath the ground surface level 43, all within a well/borehole 1, which borehole 1 is then backfilled with a fill material, such as a heat conductive grout, where geothermal heat exchange occurs by means of thermal contact with naturally occurring temperature differentials existing below the ground surface level 43 in the ground 2. The drilling of boreholes 1, the installation of sub-surface water/antifreeze fluid transport lines 50, and the backfilling of the borehole 1 with a fill material 4 are all well understood by those skilled in the art.

The solar fluid transport tubing 44, the solar heat to refrigerant fluid heat exchange means 39, the refrigerant to water/antifreeze fluid heat exchange means 49, the refrigerant expansion device 40, the refrigerant liquid line 12, and the water/antifreeze fluid transport line 50 are all surrounded by insulation materials 28. Open solenoid valves 27, which would be closed (not shown) to block the flow of solar heat transport fluid by means of natural convection (a heat transfer termination means) when operation of the solar heat collector 19 would not be advantageous, are also shown as being situated in the solar fluid transport tubing 44 located between the solar heat collector 19 and the solar heat to refrigerant fluid heat exchange means 39.

Figure 5:
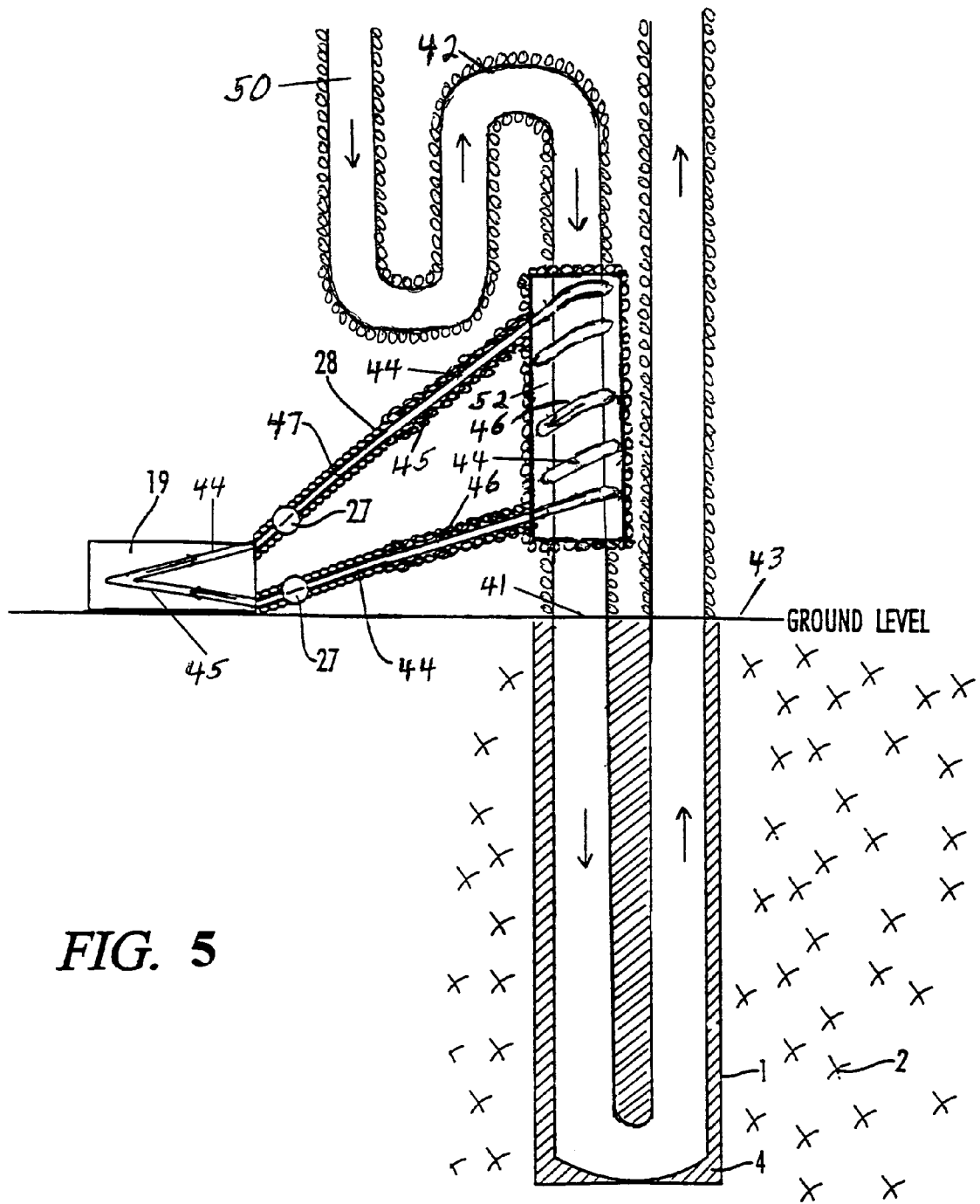
FIG. 5 is a side view of a solar heat collector operatively connected to a solar heat to water/antifreeze fluid heat exchange means, where the entering water/antifreeze fluid transport line has an inverted U bend prior to entry into the solar heat to water/antifreeze heat exchange means, where the solar heat transport lines are angled in a vertical orientation so as to avoid the necessity of a solar fluid pump, and where the water/antifreeze fluid heat exchange means is located immediately prior to the water/antifreeze fluid transport line traveling below the ground surface level 43 where geothermal heat exchange occurs.

FIG. 5 is a side view of an optional supplemental solar heat collector 19 that can be effectively utilized for any water-source geothermal heat pump system, either in a new installation or as a retrofit in an existing installed system. A basic operational design of a solar heat collector 19 has already been described in the above detailed drawings, including the operation of open solenoid valves 27, which would be closed to block the flow of solar heat transport fluid by means of natural convection when operation of the solar heat collector 19 would not be advantageous.

Regarding a water-source heat pump heating system application, the design of positioning the solar heat to one of water and water and antifreeze (water/antifreeze) fluid heat exchange means 52 immediately before the point 41 where the water-source system's thermally exposed sub-surface water/antifreeze fluid transport line 50 is located (typically at or below the ground surface level 43) is shown herein.

Also shown, regarding a solar heat to a water source heat pump's water/antifreeze fluid system application, is an inverted U bend 42 in the heat pump system's water/antifreeze fluid transport line 50, above and before the solar heat to water/antifreeze fluid heat exchange means 52, so as to help prevent any vaporized and/or hot water/antifreeze from moving in an unwanted reverse direction within the heat pump's system's fluid transport line 50 by means of vapor bubbles being lighter than liquid and/or by means of hot water/antifreeze fluid being lighter than cooler water/antifreeze fluid. The heat pump's system's fluid transport line 50 transports the heat pump system's water/antifreeze fluid (not shown herein) to and through the solar heat to water/antifreeze fluid heat exchange means 52 on its way to exchange heat with the naturally occurring temperatures existing below the ground surface level 43 in the ground 2.

Additionally, so as to assist in avoiding the necessity for a solar system fluid or water pump (20 in the prior detailed drawing number 1, but not shown here), the solar heat collector's 19 solar fluid transport tubing 44, situated within the solar heat collector 19, is shown as sloped in an upward vertical orientation 45, so as to easily permit the fluid warmed by the sun to rise, and the solar fluid transport tubing 44, situated within the solar heat to water/antifreeze fluid heat exchange means 52, is shown as sloped in a downward vertical orientation 46, so as to easily permit the fluid cooled, by means of heat transfer to the direct expansion system's refrigerant fluid, to fall. Likewise, and for similar reasons, the solar fluid (the solar fluid, not shown herein, can be one of a liquid and a vapor, depending on system design) transport tubing 44 fluid supply line 47, located between the solar heat collector 19 and the solar heat to water/antifreeze fluid heat exchange means 52, is shown as extended and sloped in an upward vertical orientation 45, and the solar fluid transport tubing 44, located between the solar heat to water/antifreeze fluid heat exchange means 52 and the solar heat collector 19, is shown as extended and sloped in a downward vertical orientation 46. Thus, the solar fluid transport tubing 44 entering the solar heat collector 19 is below the elevation of the solar fluid transport tubing 44 exiting the solar heat to water/antifreeze fluid heat exchange means 52.

All the solar fluid transport tubing 44 extending between (to and from) the solar heat collector 19 and the solar heat to water/antifreeze fluid heat exchange means 52 is surrounded by insulation material 28. The exterior of the solar heat to water/antifreeze fluid heat exchange means 52, and the above-ground water/antifreeze fluid transport lines, are all surrounded by insulation material 28.

An open solenoid valve 27 is shown as being located in each of the solar fluid transport tubes 44 located between the solar heat collector 19 and the solar heat to water/refrigerant fluid heat exchange means 52. These solenoid valves 27 can be programmed (as is well understood by those skilled in the art) so as to provide a means to terminate/stop heat transfer from the solar heat collector 19 when the geothermal heating/cooling system is operating in the cooling mode and when there is a lack of adequate solar supplemental heat available at night or during other periods when the supplemental heat supplied by the solar heat collector 19 is at a lower temperature than the maximum temperature in the geothermal heat exchange sub-surface environment. The solenoid valves 27, which act as a solar heat transfer termination means, are simply de-activated and opened when adequate supplemental solar heat is both available and desired.

For additional system illustration, the heat pump system's water/antifreeze fluid transport line 50 is shown as extending beneath the ground surface level 43, within a well/borehole 1 drilled into the ground 2, with the remaining interior portion of the well/borehole 1 being filled with a fill material 4, such as a heat conductive grout, or the like.

Figure 6:
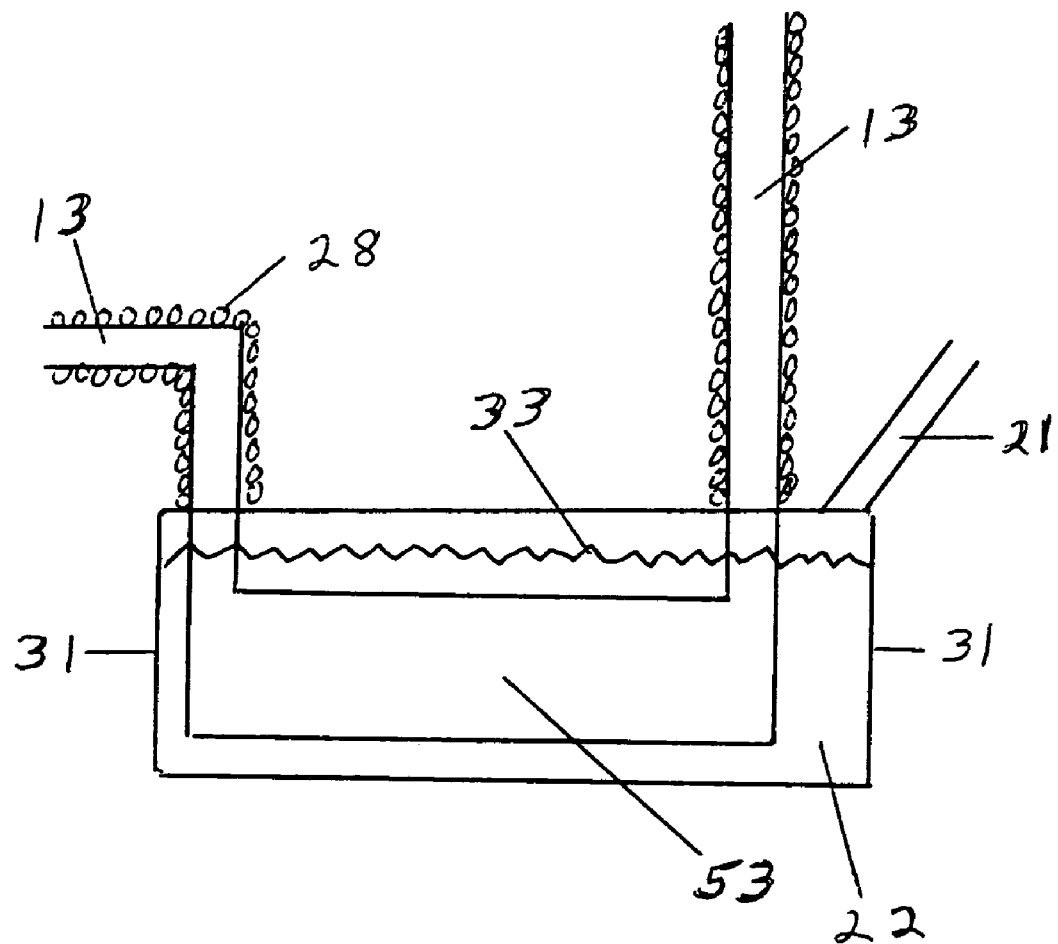
FIG. 6 shows a side view of a water-cooled hot refrigerant vapor line within a half-pipe water containment vessel, where the size of the hot enlarged refrigerant vapor line is larger than the normal design size of the refrigerant vapor line which enters and exits the half-pipe, so as to provide more surface area contact with the water within the half pipe, so as to enhance the removal of excessive heat by means of water evaporation, thereby easing the load on the sub-surface geothermal heat transfer means.

FIG. 6 shows a side view of a hot refrigerant vapor line 13 entering and exiting a half-pipe 22 water containment vessel. An enlarged refrigerant vapor line segment 53 with an expanded surface area is shown within the half-pipe 22, and is larger than (more expanded surface area than) the normal system design size of the refrigerant vapor transport line 13 which enters and exits the half-pipe 22 water containment area. The half-pipe 22 has an open top (not shown from the side view) so as to permit heated water to easily evaporate into the atmosphere. During periods of heat pump system heating mode operation, such as in the winter, the half-pipe would be fully insulated (not shown herein) so as to prevent heat loss, as would be well understood by those skilled in the art. The enlarged refrigerant vapor line segment 53 with an expanded surface area is shown here as consisting of a larger than normal system design diameter refrigerant vapor line 13, but could alternatively be an enlarged and flattened vapor line (not shown herein), or the like, so long as additional water contact surface area (an expanded surface area) was provided.

The half-pipe 22, which has sealed ends 31, is shown here as being filled with condensate water 33 by means of a condensate drain line 21, but could be similarly filled with water from any other available source, so long as the water was not corrosive to the enlarged refrigerant vapor line segment 53 with an expanded surface area within the half-pipe 22. The normal system design size refrigerant transport vapor line 13, which enters and exits the half-pipe 22 water containment area, is surrounded by insulation materials 28, such as rubatex or the like. Screening (not shown herein) would typically be placed over the open top of the half-pipe 22 so as to prevent insects, leaves, and the like from entering/clogging the condensate water 33 in the half-pipe 22, and screening (not shown herein) may be placed completely around the half-pipe 22 for safety purposes to protect against accidental contact with the otherwise exposed hot enlarged refrigerant vapor line segment 53 with an expanded surface area, as well as to protect against accidental contact with the otherwise exposed hot half-pipe 22 and hot condensate water 33. The enlarged/expanded surface area refrigerant vapor line segment 53 provides more surface area contact with the condensate water 33 within the half pipe 22 so as to enhance the removal of excessive heat by means of water evaporation, thereby easing the load on the sub-surface geothermal heat transfer means (not shown herein), which sub-surface geothermal heat transfer means for both direct expansion heat pump systems and for water-source heat pump systems are well understood by those skilled in the art.

Although particular embodiments of a system and method to enhance the operational efficiencies and installation cost functionality of geothermal heat exchange installations are described, it is not intended that such description be construed as limiting the scope of this invention, except as set forth in the following claims:

What is claimed is:

1. A direct expansion ("DX") geothermal heat exchange system having a DX geothermal heat pump operable in a heating mode and including a sub-surface geothermal heat exchanger comprising sub-surface refrigerant tubing positioned to allow primary geothermal heat transfer directly to refrigerant fluid circulating in the sub-surface refrigerant tubing, the system further comprising a supplemental solar heating system including a solar heat collector fluidly connected to a solar heat to direct expansion system refrigerant fluid heat exchanger by fluid transport tubing, wherein solar heat acquired from the solar heat collector is conveyed by means of a fluid within the fluid transport tubing, and the solar heat is transferred by the solar heat to direct expansion system refrigerant fluid heat exchanger to the refrigerant fluid in the DX geothermal heat pump.

2. The system of claim 1 wherein the fluid transport tubing between the solar heat collector and the solar heat to refrigerant fluid heat exchanger is insulated, and wherein the exterior of the solar heat to refrigerant fluid heat exchanger is insulated.

3. The system of claim 1 wherein the solar heat to refrigerant fluid heat exchanger is located at an elevation above that of the solar heat collector.

4. The system of claim 1 further comprising a solar heat transfer termination device, which solar heat transfer termination device is activated only when the DX geothermal heat exchange system is operating in a cooling mode, and during periods of time when supplemental heat supplied by the solar heat collector is at a lower temperature than a maximum temperature in the sub-surface geothermal heat exchanger.

5. The system of claim 1 further comprising refrigerant tubing fluidly connected to the solar heat to direct expansion refrigerant fluid heat exchanger, the refrigerant tubing including an inverted U bend.

6. In a geothermal direct expansion ("DX") heat exchange system, having a DX geothermal heat pump operable in a heating mode and including a sub-surface geothermal heat exchanger, an improvement comprising a supplemental solar heating system including a solar heat collector fluidly connected to a solar heat to direct expansion system refrigerant fluid heat exchanger by transport tubing, wherein solar heat acquired from the solar heat collector is conveyed by means of a fluid within the transport tubing, and the solar heat is transferred by the solar heat to direct expansion system refrigerant fluid heat exchanger to refrigerant fluid immediately prior to the refrigerant fluid entering the sub-surface geothermal heat exchanger.

7. A direct expansion geothermal heat exchange system, operating in the heating mode, comprising a supplemental solar heating system wherein heat acquired from a solar heat collector is conveyed by means of a fluid within transport tubing, and the solar heat is transferred, by a solar heat to direct expansion system refrigerant fluid heat exchange means, to the refrigerant fluid in a direct expansion system, wherein the solar collector's heat transfer tubing is always sloped in an upward vertical orientation from the bottom of the solar heat collector to the top of the solar heat to direct expansion refrigerant fluid heat exchange means, and wherein the solar collector's heat transfer tubing is always sloped in a downward vertical orientation from the top of the solar heat to direct expansion refrigerant fluid heat exchange means to the bottom of the solar heat collector.

8. A direct expansion geothermal heat exchange system, operating in the heating mode, comprising a supplemental solar heating system wherein heat acquired from a solar heat collector is conveyed by means of a fluid within transport tubing, and the solar heat is transferred, by a solar heat to direct expansion system refrigerant fluid heat exchange means, to the refrigerant fluid in a direct expansion system, wherein the solar heat to direct expansion refrigerant fluid heat exchange means is situated at a point in the direct expansion system's liquid refrigerant transport line after the direct expansion system's heating mode refrigerant expansion device and before the point where the direct expansion system's thermally exposed sub-surface refrigerant transport geothermal heat exchange tubing is located.

9. A geothermal heat exchange system, operating in the heating mode, comprising:
 a geothermal heat pump, the geothermal heat pump including system refrigerant tubing and system refrigerant moving through the refrigerant tubing;
 wherein at least a portion of the system refrigerant tubing is positioned in a sub-surface location to allow for primary geothermal heat transfer directly into the system refrigerant;
 a supplemental solar heating system, the supplemental solar heating system including a solar collector, solar heating transport tubing thermally coupled to the solar collector, and solar heating fluid moving within the solar heating transport tubing;
 a heat exchanger thermally coupled to the supplemental solar heating system and to the geothermal heat pump; and;
 wherein heat acquired from the solar collector is conveyed to the solar heat heating fluid within the solar heating transport tubing, and the solar heat is then transferred by the heat exchanger to the system refrigerant in the system refrigerant tubing.

\* \* \* \* \*